United States Patent
Anerousis et al.

(10) Patent No.: US 10,789,563 B2
(45) Date of Patent: Sep. 29, 2020

(54) BUILDING CONFIDENCE OF SYSTEM ADMINISTRATOR IN PRODUCTIVITY TOOLS AND INCREMENTAL EXPANSION OF ADOPTION

(71) Applicant: International Business Machines Corporation, Armonk, NY (US)

(72) Inventors: Nikolaos Anerousis, Chappaqua, NY (US); Shang Q. Guo, Cortlandt Manor, NY (US); Daniela Rosu, Ossining, NY (US); Frederick Y. Wu, Cos Cob, CT (US)

(73) Assignee: International Business Machines Corporation, Armonk, NY (US)

( * ) Notice: Subject to any disclaimer, the term of this patent is extended or adjusted under 35 U.S.C. 154(b) by 1030 days.

(21) Appl. No.: 14/251,144

(22) Filed: Apr. 11, 2014

(65) Prior Publication Data
US 2015/0294250 A1    Oct. 15, 2015

(51) Int. Cl.
G06Q 10/06    (2012.01)
G06Q 30/02    (2012.01)

(52) U.S. Cl.
CPC ..... *G06Q 10/0635* (2013.01); *G06Q 30/0203* (2013.01)

(58) Field of Classification Search
CPC .............. G06Q 10/0635; G06Q 30/0203
USPC ........................................ 705/7.28
See application file for complete search history.

(56) References Cited

U.S. PATENT DOCUMENTS

| | | |
|---|---|---|
| 6,912,676 B1 | 6/2005 | Gusler et al. |
| 7,975,165 B2 | 7/2011 | Shneorson et al. |
| 8,019,554 B2 | 9/2011 | Conway et al. |
| 8,024,709 B2 | 9/2011 | Jadhav et al. |
| 8,141,155 B2 | 3/2012 | Jeschke et al. |
| 8,150,717 B2 | 4/2012 | Whitemore |
| 2006/0015377 A1 | 1/2006 | Hoogs et al. |
| 2007/0033445 A1* | 2/2007 | Hirsave ............... G06F 11/3409 714/47.1 |

(Continued)

OTHER PUBLICATIONS

Comas et al. (A Software Deployment Risk Assessment Heuristic for Use in a Rapidly-Changing Business-to-Consumer Web Environment, International Journal of Software Engineering and Its Applications vol. 5 No. 4, Oct. 2011, pp. 107-126).*

(Continued)

*Primary Examiner* — Matthew D Henry
(74) *Attorney, Agent, or Firm* — Kristofer Haggerty; Otterstedt, Wallace & Kammer, LLP

(57) ABSTRACT

A system management tool, with a risk assessment mode enabled, is executed within an execution infrastructure on a management computer system, to manage a target computer system in a production situation. When the execution of the tool reaches a risk segment which raises risk for the target system, a user is informed of at least one action to be executed in the risk segment. If the user agrees, the tool is allowed to execute in an automatic mode until an end of the risk segment is reached. Feedback is obtained from the user regarding safety of the risk segment; and the steps are repeated for a plurality of additional risk segments until the tool is deemed safe for all of the risk segments, after which the tool is transitioned from the risk assessment mode to an automatic mode of operation.

25 Claims, 13 Drawing Sheets

(56) References Cited

U.S. PATENT DOCUMENTS

| | | | |
|---|---|---|---|
| 2009/0182593 A1* | 7/2009 | Whitmore | G06Q 10/063 705/7.28 |
| 2010/0205673 A1* | 8/2010 | Burrell | G06F 21/54 726/25 |
| 2011/0067005 A1* | 3/2011 | Bassin | G06F 11/008 717/127 |
| 2012/0029969 A1* | 2/2012 | Franke | G06Q 10/06 705/7.28 |
| 2012/0072259 A1 | 3/2012 | Morimura et al. | |
| 2012/0215575 A1* | 8/2012 | Deb | G06Q 10/0635 705/7.12 |
| 2013/0007245 A1 | 1/2013 | Malik et al. | |
| 2013/0018702 A1 | 1/2013 | Smith et al. | |
| 2014/0172497 A1* | 6/2014 | Kim | G06Q 10/0635 705/7.28 |
| 2014/0282406 A1* | 9/2014 | Narasimhan | G06F 11/008 717/124 |

OTHER PUBLICATIONS

Greco et al.; "Mining and Reasoning on Workflows", IEEE Transactions On, Knowledge and Data Engineering, vol. 17, Issue 4, Apr. 2005, pp. 519-534.

IP.COM et al.; "Risk Assessment", IPCOM000218811D, Jun. 7, 2012, pp. 1-37.

\* cited by examiner

BUILDING CONFIDENCE OF SYSTEM ADMINISTRATOR IN PRODUCTIVITY TOOLS AND INCREMENTAL EXPANSION OF ADOPTION

STATEMENT OF GOVERNMENT RIGHTS

Not Applicable.

CROSS-REFERENCE TO RELATED ART

Not Applicable.

FIELD OF THE INVENTION

The present invention relates to the electrical, electronic and computer arts, and, more particularly, to information technology (IT) services management and analytics, and the like.

BACKGROUND OF THE INVENTION

A system administrator (SA) typically maintains and/or operates a computer system and/or network. By way of non-limiting examples, SAs install, support, and/or maintain servers or other computer systems, and/or plan for and/or respond to service outages and other problems. System management tools expand the coverage of SA activities and reduce the SA effort required for end-to-end execution of these activities.

SAs are typically reluctant to adopt new tools because of the perceived risks of affecting system availability and compliance with Service Level Agreements (SLAs).

SUMMARY OF THE INVENTION

Principles of the invention provide techniques for building the confidence of system administrator(s) in productivity tools (e.g., tools for which code is available for analysis and step-by-step execution) and/or incrementally expanding adoption thereof. In one aspect, an exemplary method includes the step of executing a system management tool, with a risk assessment mode enabled, within an execution infrastructure on a management computer system, to manage a target computer system in a production situation. A further step includes, during execution of the system management tool with the risk assessment mode enabled, when the execution of the tool reaches a risk segment which raises risk for the target system, informing a user of the tool of at least one action to be executed in the risk segment. Further steps include, if the user agrees, allowing the tool to execute in an automatic mode until an end of the risk segment is reached; obtaining feedback from the user regarding safety of the risk segment; and repeating the executing, informing, allowing, and obtaining steps for a plurality of additional risk segments until the system management tool is deemed safe for all of the risk segments. A still further step includes, once the system management tool is deemed safe for all of the risk segments, transitioning the system management tool from the risk assessment mode to an automatic mode of operation.

As used herein, "facilitating" an action includes performing the action automatically, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

A risk assessment mode for code execution, which proceeds automatically unless and until reaching a pre-specified risky code segment for which the risk conditions are realized on the target configuration item, at which point it transfers control to a System Administrator for manual execution and observation.

A risk assessment mode for code execution, which provides the System Administrator with documentation of the conditions and results of prior execution of risky code segments, and which documents current decisions to proceed or abort execution and execution results.

A risk assessment mode for code execution, which evolves into automatic mode as the System Administrator validates safe execution of each risky code segment as its conditional execution is encountered over multiple code execution instances.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
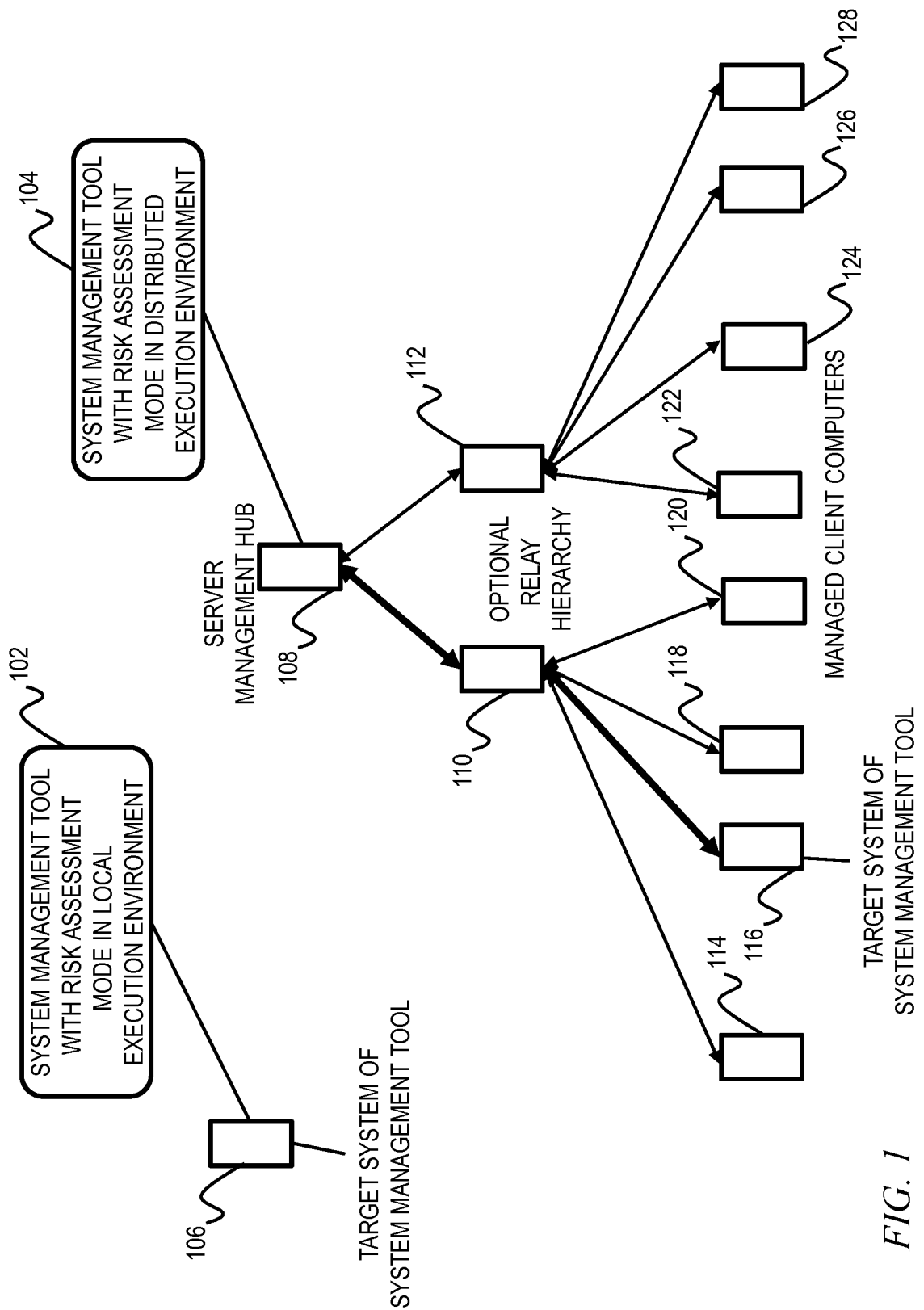
FIG. 1 shows a system diagram, in accordance with an aspect of the invention.

One or more embodiments advantageously provide a system and/or method of building confidence of a system administrator in productivity tools and/or incremental expansion of adoption thereof.

New system management tools are being developed to expand the coverage of SA activities and reduce the SA effort required for end-to-end execution of these activities—overall with the goal to increase SA productivity. Sample tool categories include automation, situational awareness (through content integration and knowledge extraction—e.g. alert signals, situation classification). Higher productivity gains are achieved from complex activities, thus the developed tools are complex with respect to task decomposition, execution flows, and input/output transformation across tasks.

Tools are typically adopted when SAs and/or organizations have confidence that the tool satisfies their requirements, and when the balance between effort reduction and learning and/or deployment effort is significantly positive. SA requirements for system management tools include ease of use (i.e., take limited effort to operate), reliability (i.e., execute correctly the tasks they are intended for), and risk-free (i.e., do not have unwanted effects on systems and business processes).

When tools are developed outside of an SA and/or organization's scope (i.e., with low development costs), the cost of proving the risk-free feature of the new tool in the context of the organization is, most often, the bottleneck for building confidence and achieving full adoption benefits. Risk assessment is typically performed as part of deployment efforts. It has high costs because it demands high skills and major effort for comprehensive identification of use cases (some being rare events) and for testing of the tool (i.e., covering all of the system states in which the tool could execute).

State of the art strategies to adopt tools when SA confidence is low (i.e., some risk is perceived) include limiting the use to risk-free, proven use case scenarios (limiting by configuration settings or by SA's assessment of the execution context before using the tool); establishing processes to include "rehearsals" for higher-risk situations; and/or executing semi-automatically with the SA validating the outcome of the previous task and the pre-computed command and/or parameters for next task, or recovering the previous task.

Advantageously, one or more embodiments achieve better adoption and/or productivity benefits via an incremental, integrated process for tool verification and exploitation.

In one or more embodiments, new system management tools can execute in "risk assessment mode," a mode which allows system administrators to observe detailed tool behavior safely, and gradually build up confidence that the tool functions as expected. Furthermore, in one or more embodiments, a specialized tool execution infrastructure is used for execution of tools in risk assessment mode and for collection and analysis of execution assessment data.

SAs can work individually or in a team (or social network) to test and build confidence in a tool. The tool execution infrastructure provides methods for the team to share the insights acquired from each SA's individual tool execution. In risk assessment mode, when tool execution reaches a step (execution block) that raises risks for the target system, the execution infrastructure informs the user of the actions that will be executed in the step, the risks, and the experience of past executions, performed by the same or different user. Optionally, the tool shows online availability of previous users for consultation. The user decides whether to proceed. If the user chooses to proceed, then the execution continues in automatic mode to the end of the segment.

At this point, in one or more embodiments, the user provides feedback on whether the execution was safe or not, and this is recorded by the execution infrastructure. The tested tool can be stopped or it can be permitted to execute automatically until another risk-raising segment is detected. Optionally, when tools are designed with the capability of saving and restoring system state if requested, upon completion of a risk segment, if the user chooses to stop execution, the tool restores the original system state if the user desires.

In at least some instances, execution infrastructure provides tool evaluation reports with statistics that document the situations (system risk conditions) in which the tool executed safely or failed. This feature enables the user to quantify the quality of the tool and coverage of test scenarios. After the user has developed confidence in the tool through extensive use in risk assessment mode, the user can indicate which tool actions are safe. The tool will execute in automatic mode through the code segments that relate to safe actions. As more code segments are deemed safe, the involvement of the SA in executing the task is reduced. When the tool is deemed safe for all of the relevant risky actions, then execution can switch to complete automation, thereby completing adoption of the new tool. A policy may determine whether and when switching to automatic mode occurs for the individual user and/or as to any type of user group (e.g. by account or data center).

It is worth noting that one or more embodiments of the invention differ from a debugger with regard to model of risk actions, assessment of risk occurrence, and collection of execution assessment. More particularly, in a debugger, the risk action model is in the mind of the user SA at execution time; whereas in one or more embodiments, the risk action model is defined in a data base, collected from SMEs and/or best practices. Furthermore, in a debugger, the risk occurrence is tested by the user by setting appropriate break points and assessing the value of risk assertions; whereas in one or more embodiments, risk occurrence is tested by the execution infrastructure. Even further, in a debugger, result(s) of evaluation is/are collected manually, by the user, with upload to a database for team reference and reporting; whereas in one or more embodiments, the result(s) of evaluation of risk is/are collected by the execution environment and automatically uploaded to databases for team reference, reporting, and infrastructure reference during subsequent executions.

One or more embodiments maximize exploitation of productivity tools while risk assessment is still in progress. At least some instances model risk as a collection of risk actions which, when executed, cause or increase the likelihood that a high-risk system failure occurs. For example, "remove a file known to be relevant for an application when the application is running," "reboot a server when users are logged on." A risk action involves a specific operation and one or more managed resources (or configuration items, CI).

One or more embodiments identify risk conditions, i.e., situations when a risk action is likely to execute, and track whether the action executed or not, providing reports and documentation to support the user in performing risk assessment. If tool execution completes automatically, the SA knows that risk conditions either did not occur on the targeted resources, or that the risk actions corresponding to those conditions had already been validated. In at least some instances, the tool executes in fully automated mode after the tool is validated for all of the materialized risk conditions, and the tool executes in semi-automated mode when it is not validated for all of the risk actions. The SA is provided a description, and possibly emulation, of the risky code segment, and has to decide if execution should proceed or stop. He or she provides feedback on the actual tool level of safety.

One or more embodiments support incremental risk assessment at the granularity of risk conditions. Some risk conditions occur more frequently, while others are rare events. Delaying fully-automated execution until all execution-constraints are validated limits the realization of expected benefits. SAs learn about the degree of risk relative to each risk condition from reports on how the tool executes under risk conditions. SAs can assess the tool as risk-free for some types of risk actions after repeated correct execution. This acknowledges that the tool can execute in fully automated mode when no other risk conditions are materialized.

One or more embodiments are materialized with a dedicated infrastructure that can identify risk conditions and interpret risk actions, and can drive automated tool execution and track execution results.

At least some instances can be applied to tools developed in both interpreted (e.g. shell scripts, Tivoli Endpoint Manager fixlets) or compiled (e.g., Java) languages. Some embodiments require specific instrumentation by a tool developer or a specialized code analysis component; the instrumentation is turned off as risk assessment completes, and can be turned on again upon relevant changes in the managed environment. Some embodiments can be applied to non-automation scripts by identifying, as risk segments, those code segments for which the accuracy of intermediate execution results needs to be verified under some conditions, and, as risk actions, the actual output of these execution results for use by other code segments or tools.

One or more embodiments provide a method for controlled execution of system management tools that identifies and prevents the execution of unsafe code. In some cases, the system management tool is annotated by the system administrator to identify risky system-state change operations. In some cases, an execution risk-model is associated with the system. In one or more embodiments, the system management tool is executed in an environment that can detect the segments of code with risky operation and check whether the current script parameters and the current state of the computer system raise any actual risk, as per a risk model registered with the environment. In some cases, the execution environment provides online feedback to the system administrator about the level of risk of a code segment, and waits for a system administrator decision to proceed if the risk level is high. In at least some embodiments, the system administrator can abort the execution of the risky code, or can override the segment with his or her own manual operations.

In some embodiments, the execution environment does not stop for system administrator decision to proceed if the code segment is assessed as not raising any actual risk, either based on the risk model or by prior specification by the system administrator that the specific code segment is safe for the current parameters and system state.

Some instances provide a method for the system administrator to make decisions about the risk and fixes required by a system management tool based on information that he or she acquires from the tool execution environment about the quality of the tool, history of risks, and outcomes.

In some cases, the risk model is defined by subject matter experts (SMEs) and augmented using Configuration Management database content and risk-awareness rules among CIs and their relations and properties.

In some instances, automated tools are used to create a preliminary annotation of a system management tool based on the risk model, which the system administrator will evaluate, revise, and register.

In some embodiments, the risk model from one computer system can be reused in another computer system.

Many variations are possible. For example, instead of actually executing each risk segment after the user approves its execution, the execution can be deferred until the user has approved the execution of all risk segments in the current tool invocation, thus eliminating the fragmentation in SA's assessment of risks (and, when applicable, the need to undo execution). In some cases, upon reaching a risk segment with materialized risk constraints, instead of either stopping execution completely or executing the whole segment in automated mode, the user can choose step-by-step execution of the risk segment, in order to gain better awareness of tool behavior.

If the user chooses to stop execution in some cases, the user either studies tool documentation to improve understanding of its intended behavior or works with the tool developers to customize the tool to achieve the desired behavior. Upon tool changes the risk assessment is restarted. Users or developers may start with existing software that is not instrumented for risk assessment mode, and have SMEs (developers, users, and/or third party(ies)) identify and register the risk segments, risk conditions, and risk actions, and/or build modules for execution simulation of these steps for use in risk assessment mode.

Specialized pieces of software can provide for analysis and annotation related to risk actions and/or risk conditions. A specialized tool can analyze the tool code to identify risk segments; another specialized tool can generate the documentation to be presented to the user upon occurrence of a risk condition.

A system management tool in risk assessment mode can be applied to multiple systems simultaneously, enabling the user to observe behavior in a variety of situations. Across all systems, there might be a common set of risk actions. Some systems might have a specific set of risk conditions, in addition to the common set. When a tool is validated for a risk action, the validation typically applies to all systems that could materialize the risk action.

FIG. 1 presents an exemplary system diagram. Embodiments of the invention can be applied in distributed environments and/or on individual servers. The latter case is shown at 102, 106, where system management tool 102 with risk assessment mode operates in a local execution environment; target system 106 is the target of the system management tool. The distributed case is depicted in connection with tool 104. In particular, system management tool 104 with risk assessment mode in a distributed execution environment has as its target system 116. The distributed system includes server management hub 108 and an optional relay hierarchy 110, 112. Relay 110 manages client computers 114, 116, 118, and 120, while relay system 112 manages client computers 122, 124, 126, and 128. The interconnections between tool 104 and target system 116 are shown in a heavier line weight as compared to the other interconnections.

Figure 2:
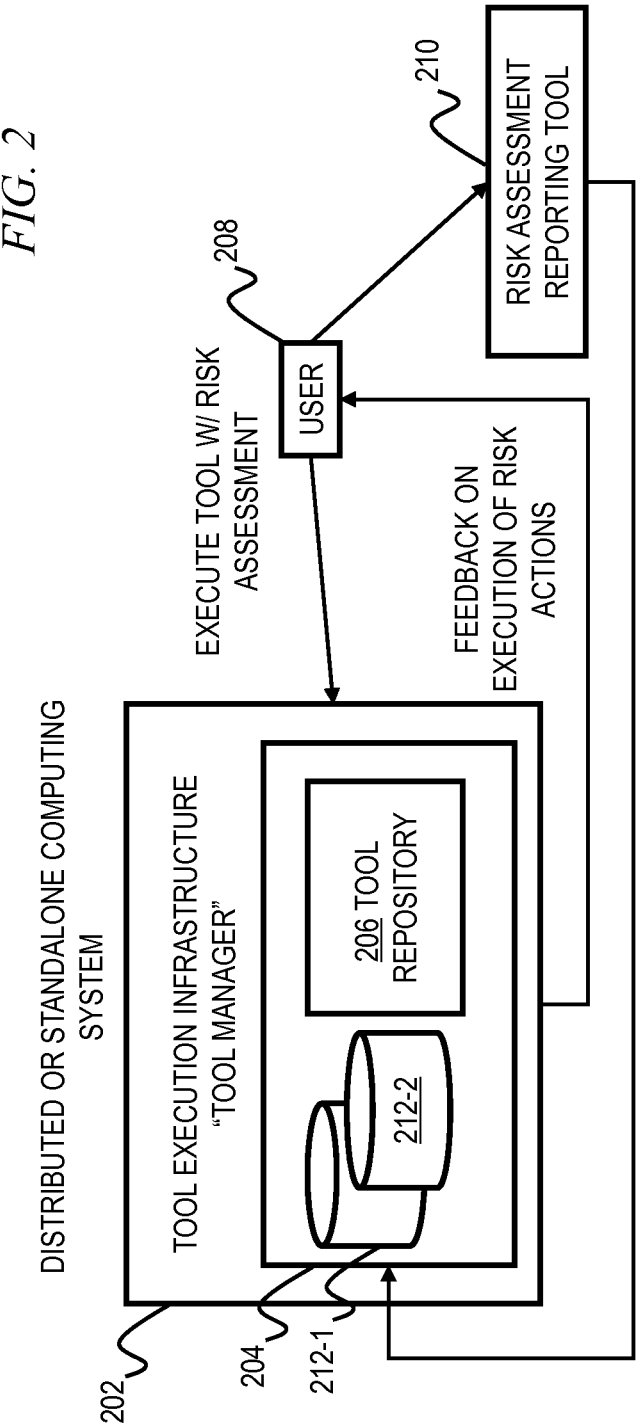
FIG. 2 shows user-tool interactions, in accordance with an aspect of the invention.

FIG. 2 shows exemplary user-tool interactions. User 208 uses a risk assessment tool to assess a distributed or stand-alone computing system 202. The tool executes within an infrastructure including a tool manager, as seen at 204; the manager manages the tools in the tool repository 206 and the associated supporting databases 212-1, 212-2 . . . (only the first and second databases are shown to avoid clutter; any desired number n can be employed). The manager 204 provides the user 208 with feedback on the execution of risk actions. The user 208 can also use risk assessment reporting tool 210 to, in turn, provide feedback to the manager 204. The supporting databases 212-1, 212-2 . . . can include, for example, the six databases (DB) as follows:

DBValid—DB WITH VALIDATED (TOOL, RISK SEGMENTS, COMPUTER SYSTEM, CI SET)
DBRiskSegment—DB WITH DETAILS ABOUT TOOLS AND THEIR RISK SEGMENT DECOMPOSITION
DBAction—DB WITH ACTION SPECIFICATION, SPECIALIZED ON OS/TECHNOLOGY
DBRiskAction—DB WITH RISK ACTION SPECIFICATION
DBRiskCondition—DB WITH RISK CONDITION SPECIFICATION
DBAssessmentTracking—DB WITH TRACKING/DOCUMENTATION OF TOOL EXECUTION IN RISK ASSESSMENT MODE.

Figure 3:
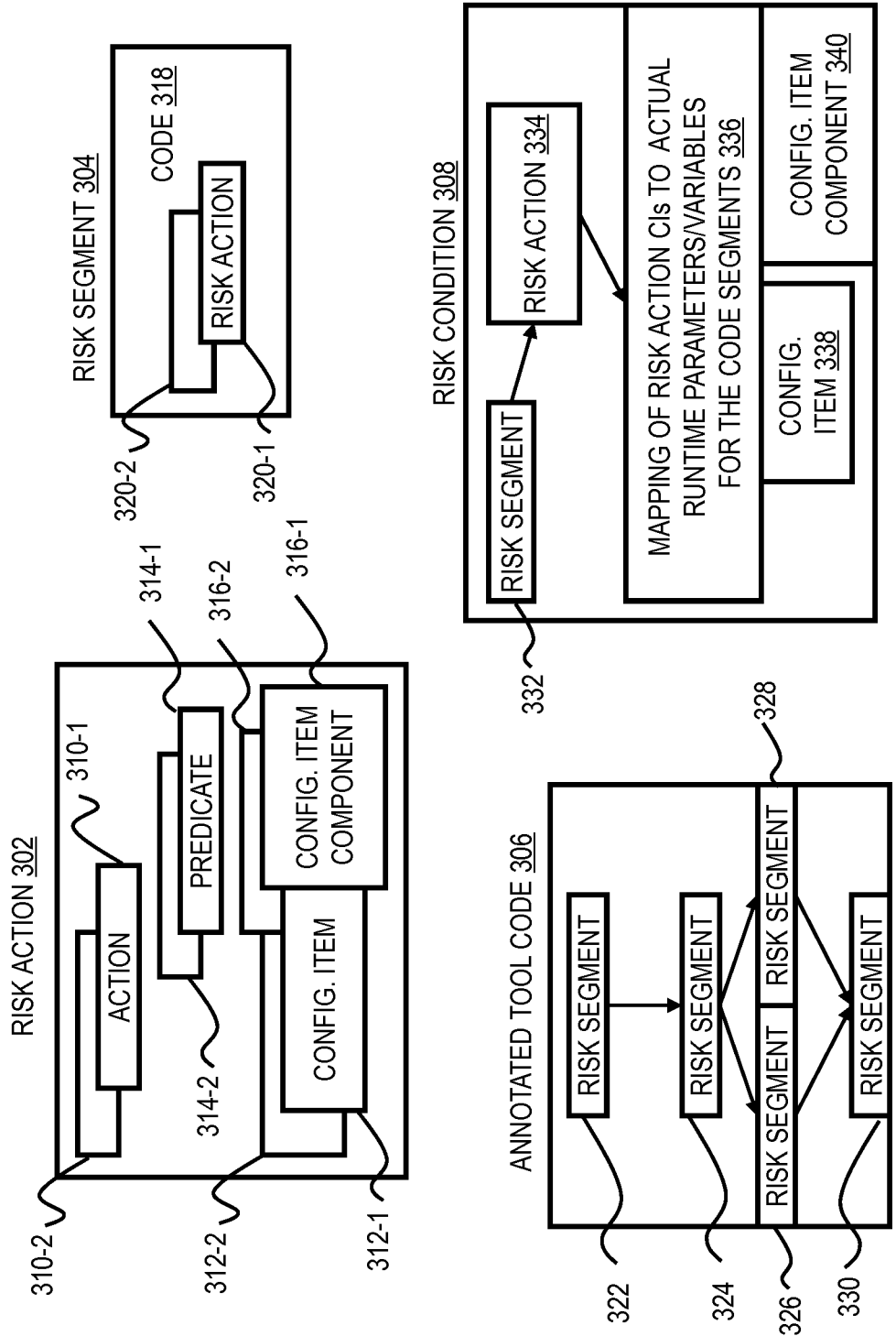
FIG. 3 shows artifacts of the method for execution in risk assessment mode, in accordance with an aspect of the invention.

Consider artifacts of the method for execution in risk assessment mode. An action is a system management operation applied to a configuration item (CI) (itself or a subcomponent); e.g., remove file, reboot server, mount/unmount file system, etc. Referring now to element 302 in FIG. 3, a risk action is a tuple of (action(s) 310-1, 310-2; related CI(s) 312-1, 312-2 with components 316-1, 316-2; and risk predicate(s) 314-1, 314-2), which identifies a high-risk system state. Namely, when an action is executed on the related CIs, and any of the risk predicates is true, then a high-risk system state is reached. Examples include removing an opened file, rebooting the system when users are logged on, and the like. The list of CIs includes the CIs affected by actions directly, and those that are affected indirectly, and thus are referenced by predicates. For instance, for an action of operating system restart, the backup service is affected indirectly if active. Overall, the risk action artifact captures the insight that some commands (actions) are risky only when applied to specific CIs and specific states; for example, removing files is not a risk action when applied to closed files from system TEMP directory. Risk actions can be generic, where the CIs are described only in terms of object type (e.g. computer system, file, user, latest version anti-virus configuration file), or can be specific, where specific CIs are referenced—for example, such as the IBM® WebSphere® Application Server program (registered marks of International Business Machines Corporation, Armonk, N.Y., USA) running on the server.

A risk segment 304 is a segment of tool code 318 that performs specific action(s), and can be mapped to zero, one, or more risk actions 320-1, 320-2 . . . . A risk segment identifies a segment of code that can be executed without SA intervention and is thus deemed "safe." A risk segment is safe to execute if all risk actions can be executed safely on the related CIs.

Consider element 306, tool code annotated for risk assessment: code segments (i.e. sequence of operations to execute) are labeled with 1) set of actions performed (completely specified action instances, including parameters, 2) pattern or script language segment that identifies the CIs involved by the actions, 3) risk actions relevant for the segment. Only the actions typically related to risk actions are of interest. Element 306 shows a flow chart of the tool code which has been annotated to flag a plurality of risk segments 322, 324, 326, 328, and 330.

A risk condition 308 in annotated tool-code involves a runtime assessment that the execution of a risk segment 332 is likely to lead to a critical system state. In order to verify the risk condition, identify the risk actions 334 related to the risk condition, and use the actual runtime parameters and system state 336 to identify the actual CIs references 338 and CI component references 340 that relate to the risk actions 334. Block 336 depicts mapping of risk action CIs to actual runtime parameters/variables for the code segments. The determination of the degree of safety of the risk segment is based on the evaluation of the risk action predicates for these CIs references (338, 340).

Deployment of a tool for risk assessment on a specific server includes installing annotated tool code, as well as instantiating and loading the catalog of risk actions for the specific server configuration.

Figure 4:
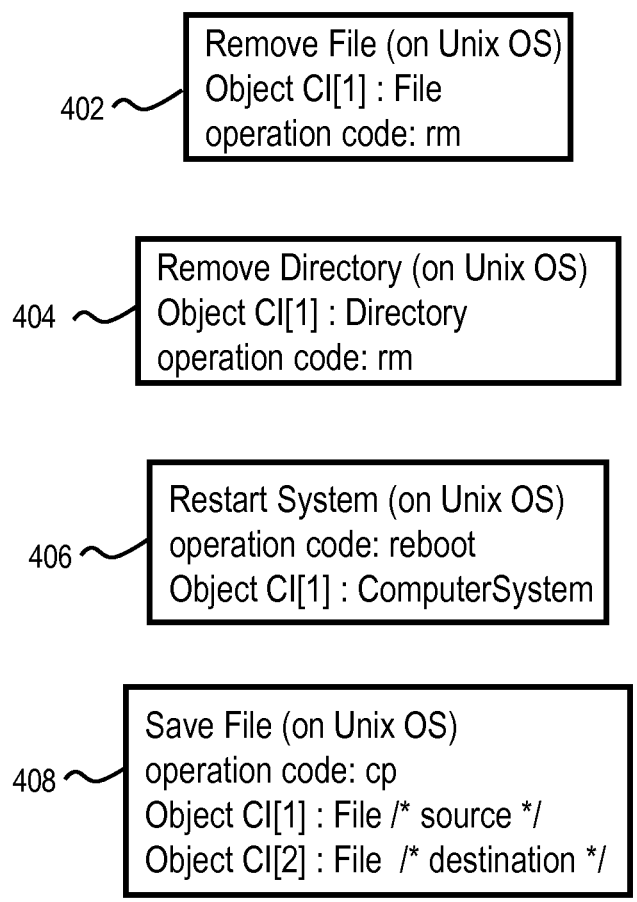
FIG. 4 shows generation of an action database, in accordance with an aspect of the invention.

Consider now the generation of supporting databases and the collection of known actions & risk actions. In at least some cases, such actions are performed by subject matter experts (SMEs) based on their expertise regarding what actions and what CIs lead to risky actions. In some embodiments, SMEs can use information in a configuration management database (CMDB) and dedicated tools in order to determine what CIs are relevant for risk actions. With regard to generation of an action database, in one or more embodiments, SMEs specify action instance(s) based on their expertise regarding what kind of operations can be executed on specific computing systems. Furthermore, SMEs may analyze the code of the tools to be submitted for risk assessment in order to determine what operations are executed. For example, a code analyzer tool can extract commands from a given tool code. SMEs can match against existing action instances, and add those that are missing. In some cases, actions may be specific to a set of computing system features (such as type of hardware, or operating system (OS)). FIG. 4 shows a non-limiting exemplary set of actions for the UNIX operating system; remove file 402; remove directory 404; restart system 406; and save file 408.

Figure 5:
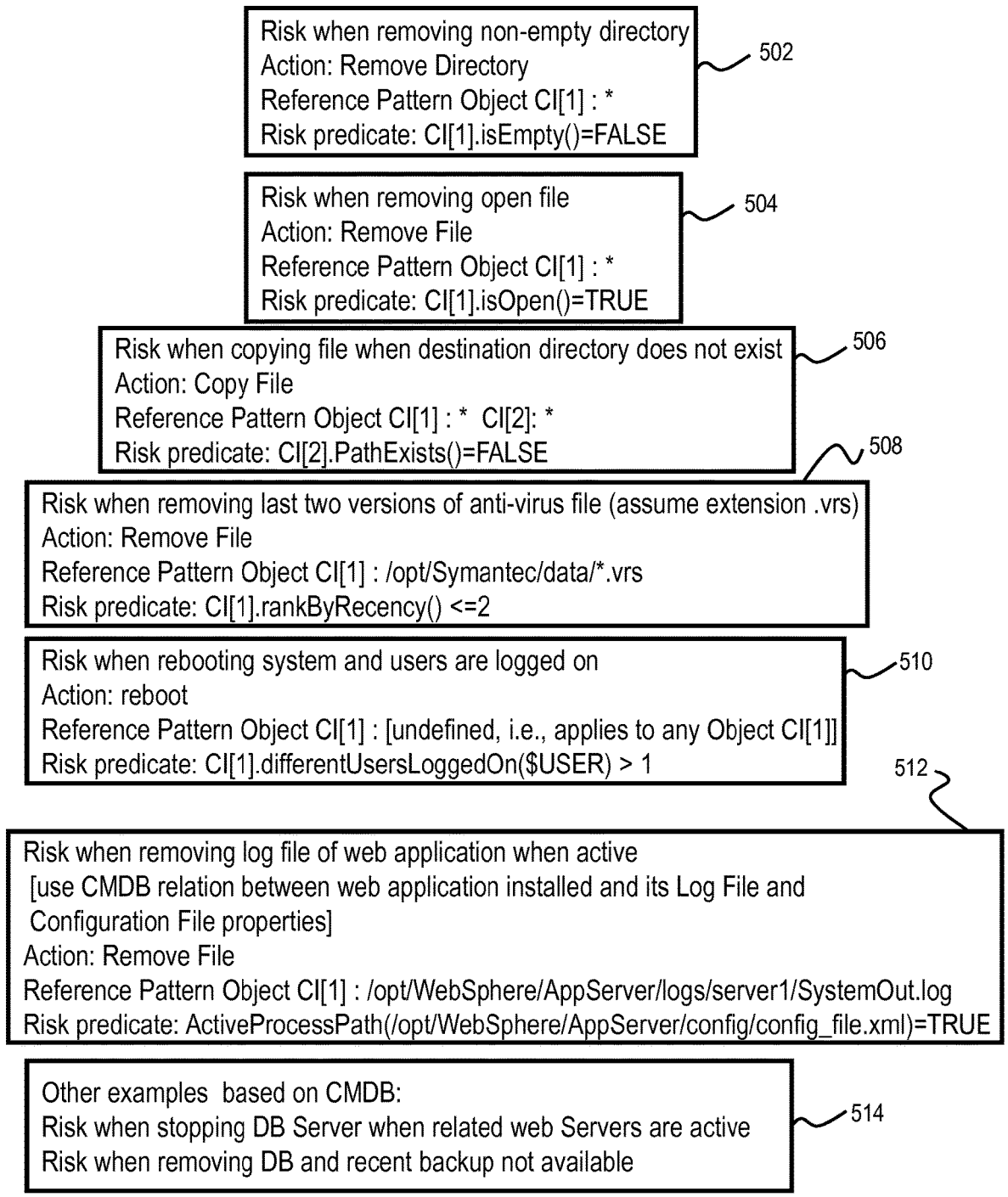
FIG. 5 shows generation of a risk actions database, in accordance with an aspect of the invention.

SMEs specify Risk Action instance (Action, CI reference pattern(s), risk predicate(s) related to the CIs) based on their expertise with respect to the risks that may be incurred with the execution of an action. CI patterns may be defined based on system or script variables, or on absolute references. Examples are shown at 502-510 in FIG. 5. SMEs may use specialized tools to automatically generate Risk Actions based on CMDB CI relations, as shown at 512, 514. In some embodiments, a library of scripts is created by SMEs to support the risk-action predicate evaluation. A script will be created for each type of CI and CI feature that is referenced in the predicate. The SMEs define and register these scripts upon action/risk-action specification.

Figure 6:
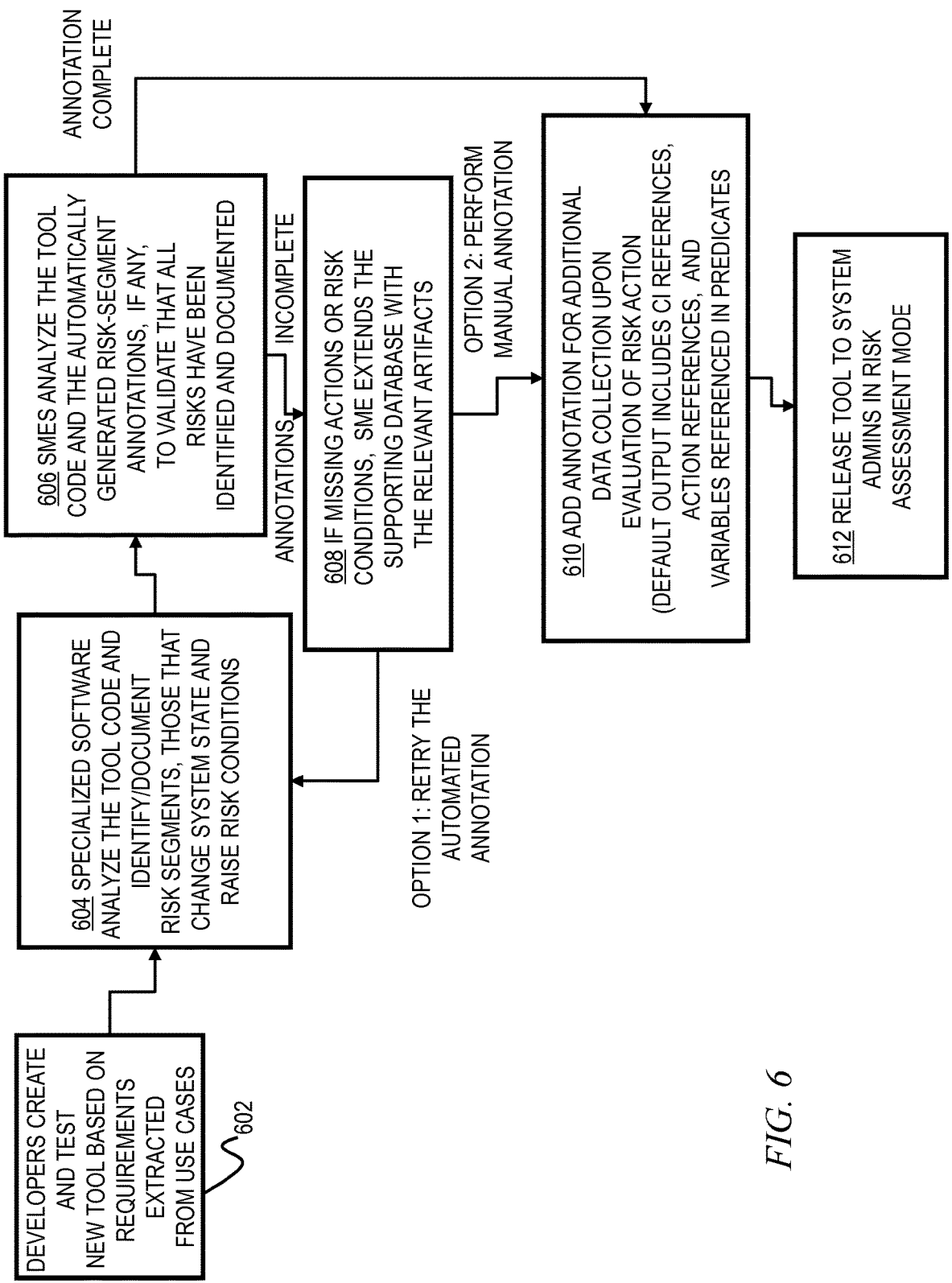
FIG. 6 shows a method for building user confidence (build time aspects), in accordance with an aspect of the invention.
Figure 7:
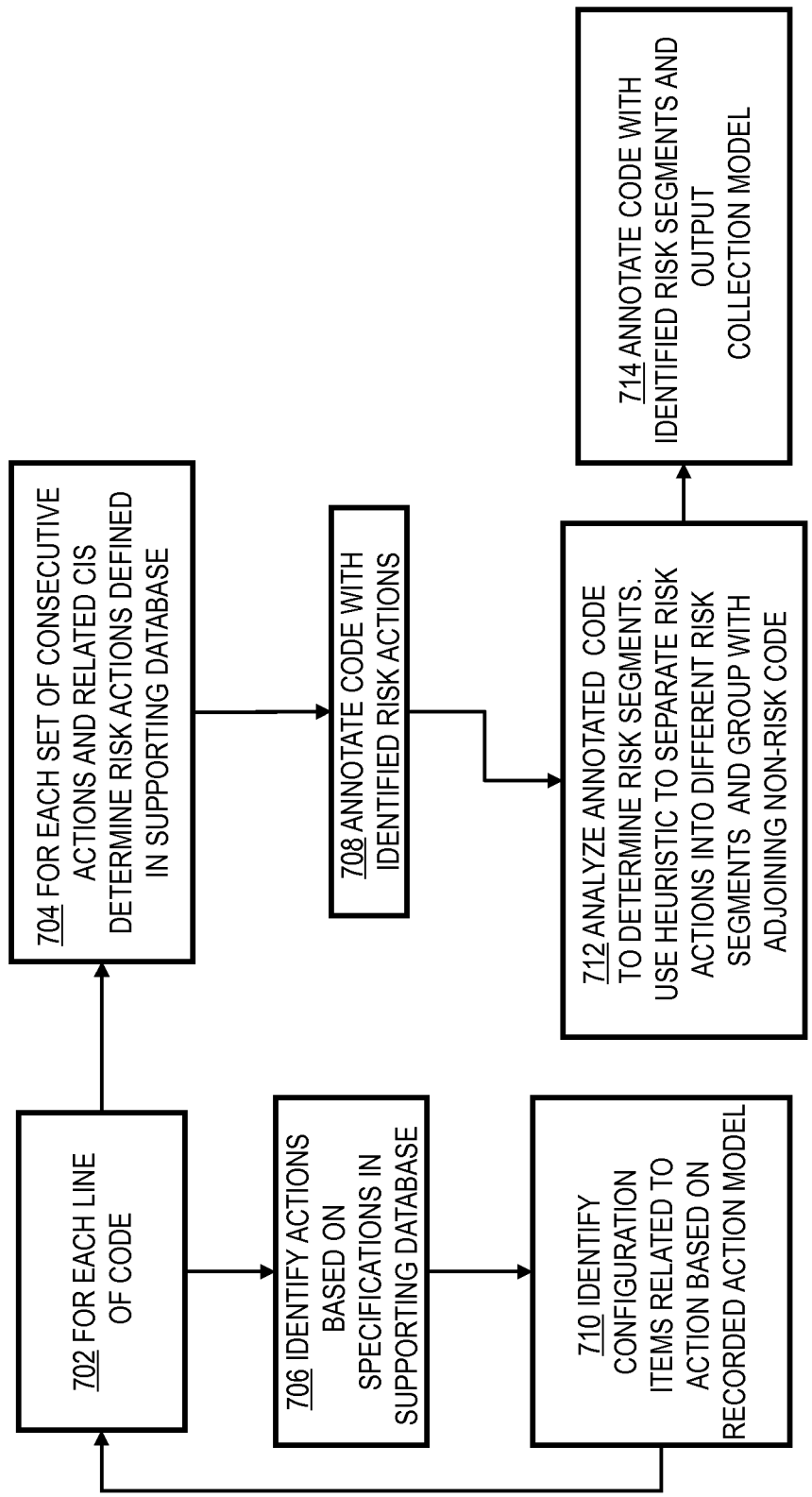
FIG. 7 shows a method for annotation with risk segments by specialized software, in accordance with an aspect of the invention.

FIGS. 6 and 7 shown build time aspects of a method for building user confidence. In step 602, developers create a new tool based on requirements extracted from use cases. In step 604, specialized software is used to analyze the tool code and identify and/or document risk segments; in particular, those that change system state and raise risk conditions (see further discussion with regard to FIG. 7). In step 606, SMEs analyze the tool code and the automatically generated risk-segment annotations, if any, to validate that all risks have been identified and documented. If the annotations are complete, proceed to step 610; if not, proceed to step 608. In step 608, if related actions or risk conditions are not in the database, the SME extends the supporting database with the relevant artifacts. In a first option, retry the automated annotation, and logical flow returns to step 604. In a second option, perform manual annotation, in which case logical flow proceeds to step 610. In step 610, add annotation for additional data collection upon evaluation of risk action (default output includes CI references, action references, and variables referenced in predicates). In step 612, release the tool to system administrators in risk assessment mode.

FIG. 7 shows one non-limiting example of a method for annotation with risk segments by specialized software, as per step 604. In step 702, for each line of code, identify actions based on specifications in the supporting database, as in step 706, and identify the configuration items related to action based on the recorded action model, as in step 710, after which logical control returns to step 702. Meanwhile, in step 704, for each set of consecutive actions and related CIs, determine risk actions defined in the supporting database. Then, in step 708, annotate the code with identified risk actions. In step 712, analyze the annotated code to determine risk segments. Use heuristic(s) to separate risk actions into different risk segments and group with adjoining non-risk code. Finally, in step 714, annotate the code with identified risk actions and output a collection model.

Figure 8:
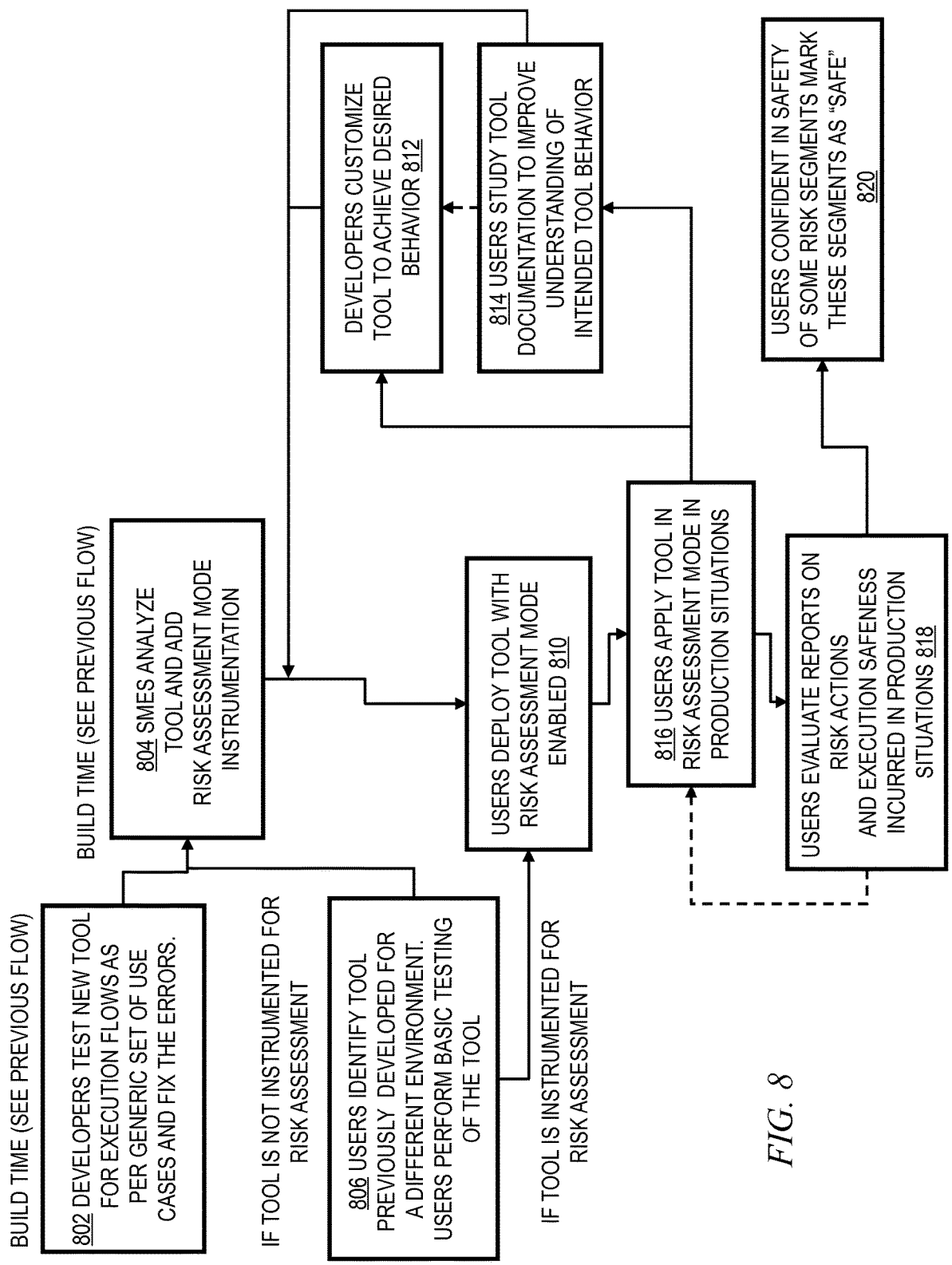
FIG. 8 shows a method for building user confidence (run time aspects), in accordance with an aspect of the invention.

FIG. 8 shows run time aspects of a method for deployment of a tool and building user confidence. It should be noted that FIG. 8 and FIG. 6 have some degree of overlap: namely, blocks 802 and 602 are similar; furthermore, block 804 refers to SMEs analyzing the tool and adding risk assessment mode instrumentation while block 612 refers to releasing the tool to system administrators in risk assessment mode. In addition, FIG. 8 identifies three use case scenarios: assessment for a newly developed tool (802, 804, 810 . . . ), assessment for reused tool with prior instrumentation for risk assessment (806, 810 . . . ) and assessment for a reused tool without prior instrumentation for risk assessment (806, 804, 810 . . . ).

Consider two alternatives to generate the code of a productivity tool, namely implementation 802 and code reuse 806. In step 802, during build time, developers test a new tool for execution flows, as per a generic set of use cases, and fix the errors and follow with the instrumentation for risk assessment 804. In step 806, users identify a tool previously developed for a different environment, and users perform basic testing of the tool. If the tool is not instrumented for risk assessment, add instrumentation for risk assessment at 804. If the tool is already instrumented, the process follows to deployment of tool for risk assessment 810. In step 804, SMEs analyze a tool and add risk assessment mode instrumentation. Then proceed to step 810. A Subject Matter Expert (SME) could be, for example, a developer, user, or third party expert.

In step 816, users apply the tool in risk assessment mode in production situations. The result of execution of a tool in risk assessment mode is used in several ways. First developers can customize the tool in order to reduce execution risks, 812, and resubmit for a next cycle of deployment and assessment of risk 810. Second, SA users can study the tool documentation to understand the intended tool behavior 814. This can optionally be followed by developer work for customization 812, as indicated by the dashed arrow from 814 to 812, and finally reassessment of risk, 810. Third, users evaluate the reports on risk actions 818. This can be followed with more risk assessment 816 or with marking some risk segments as "safe" for automated execution 820. When all risk segments are marked as "safe," the tool executes in automatic mode.

Figure 9:
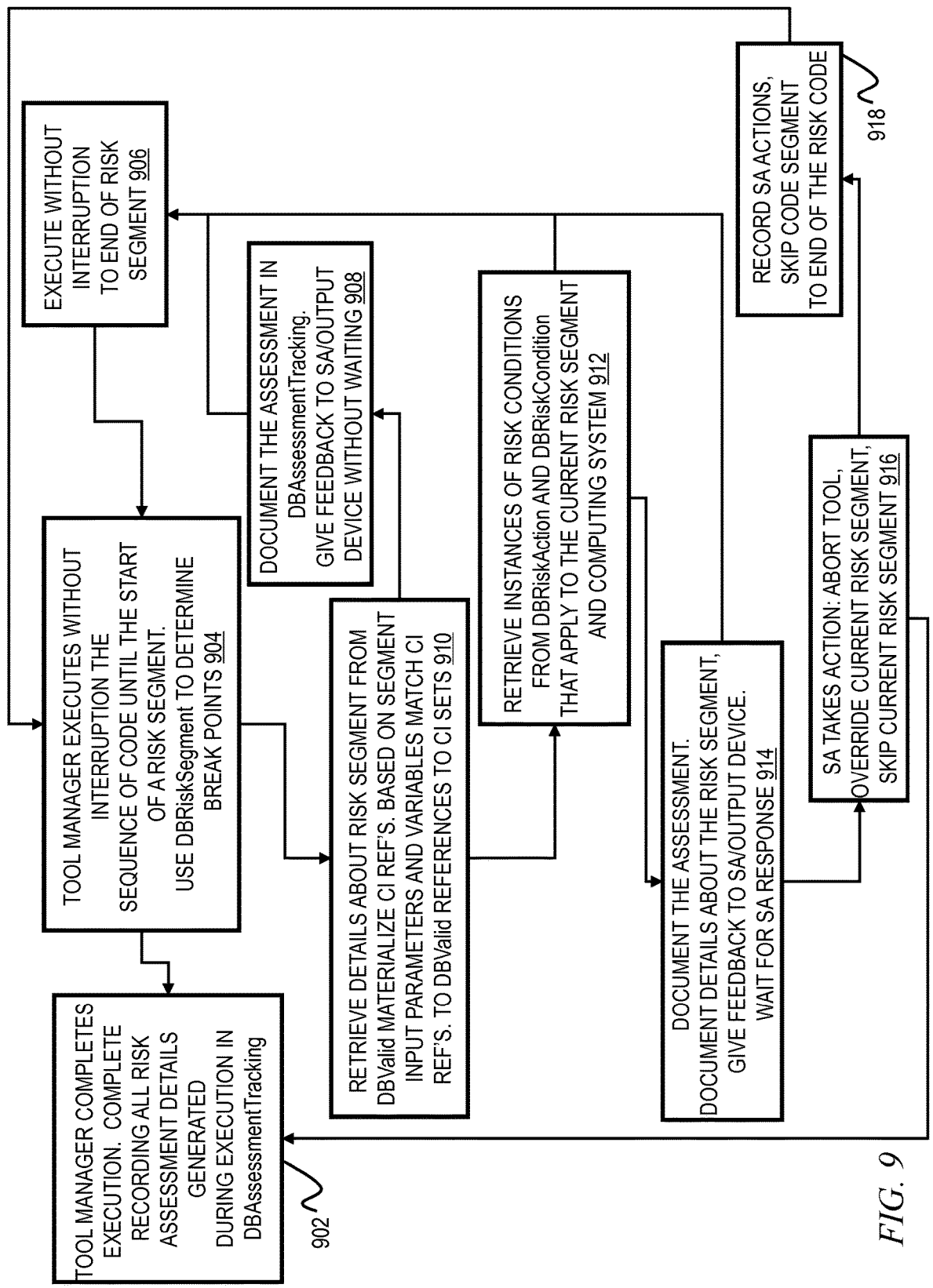
FIG. 9 shows a method for controlling tool execution in risk assessment mode, in accordance with an aspect of the invention.

FIG. 9 shows an exemplary method for controlling tool execution in risk assessment mode. Refer also again to the six exemplary databases discussed in connection with FIG. 2 and note that the references to specific databases are exemplary and non-limiting; the description is equally applicable to any database with appropriate semantics and functionality. In one or more embodiments, it is assumed that the procedure is triggered by SA or system management command to execute a specific tool on a specific computing system, the tool is annotated for risk assessment, and an SA is available for interactive operation, if needed. In step 906, execute without interruption to the end of the risk segment. In step 904, ToolManager 204 executes, without interruption, the sequence of code until the start of a risk segment. Use the risk segment specification in database, DBRiskSegment 212-1, 2, . . . , to determine break points. In step 902, if no risk segment is detected in step 904, ToolManager completes execution. Complete recording all risk assessment details generated during execution in the database object for tracking assessment activity, DBAssessmentTracking 212-1, 2, . . . . In step 910, if a risk segment is detected in step 904, materialize CI references based on segment input parameters and variables, and match these CI references in the database object DBValid 212-N that records the CI sets for which the risk segment is validated for automatic (i.e., marked as "safe"). If the risk segment is validated for the specific CI references, proceed to step 908 and document the assessment in DBAssessmentTracking. Send feedback to an SA and/or output device without waiting for the SA's acknowledgement to execute the code segment. Flow then proceeds to step 906.

On the other hand, if the risk segment is NOT validated for specific CI references, proceed to step 912 and retrieve the specification for the risk conditions 308 that related to the risk segment and computing system from database objects DBRiskCondition 212-1, 2, . . . and DBRiskAction 212-1, 2, . . . . If none of the risk condition 308 predicates (i.e., the predicates of the risk actions 302 related to the risk condition 308) are verified positively, i.e., the current execution of risk segment DOES NOT raise any risks, logical flow proceeds to step 906. If any of the risk action predicates are verified positively, i.e., the risk segment is deemed likely to raise a risk, proceed to step 914 and document the assessment. Document details about the risk segment, provide feedback to an SA and/or output device. Wait for SA response. If the SA confirms the execution, flow then proceeds to step 906. If the SA stops the execution of the risk segment, the SA may consult results from past executions, consult with previous users, and/or collect output; flow proceeds to step 916, wherein the SA takes action(s) such as aborting the tool, overriding the current risk segment, or skipping current Risk Segment. If the SA aborts the tool execution, flow proceeds to step 902. If the SA overrides or skips execution, the flow proceeds to step 918 to record SA actions, and skip code segment to end of the risk code; then return to step 904.

Figure 10:
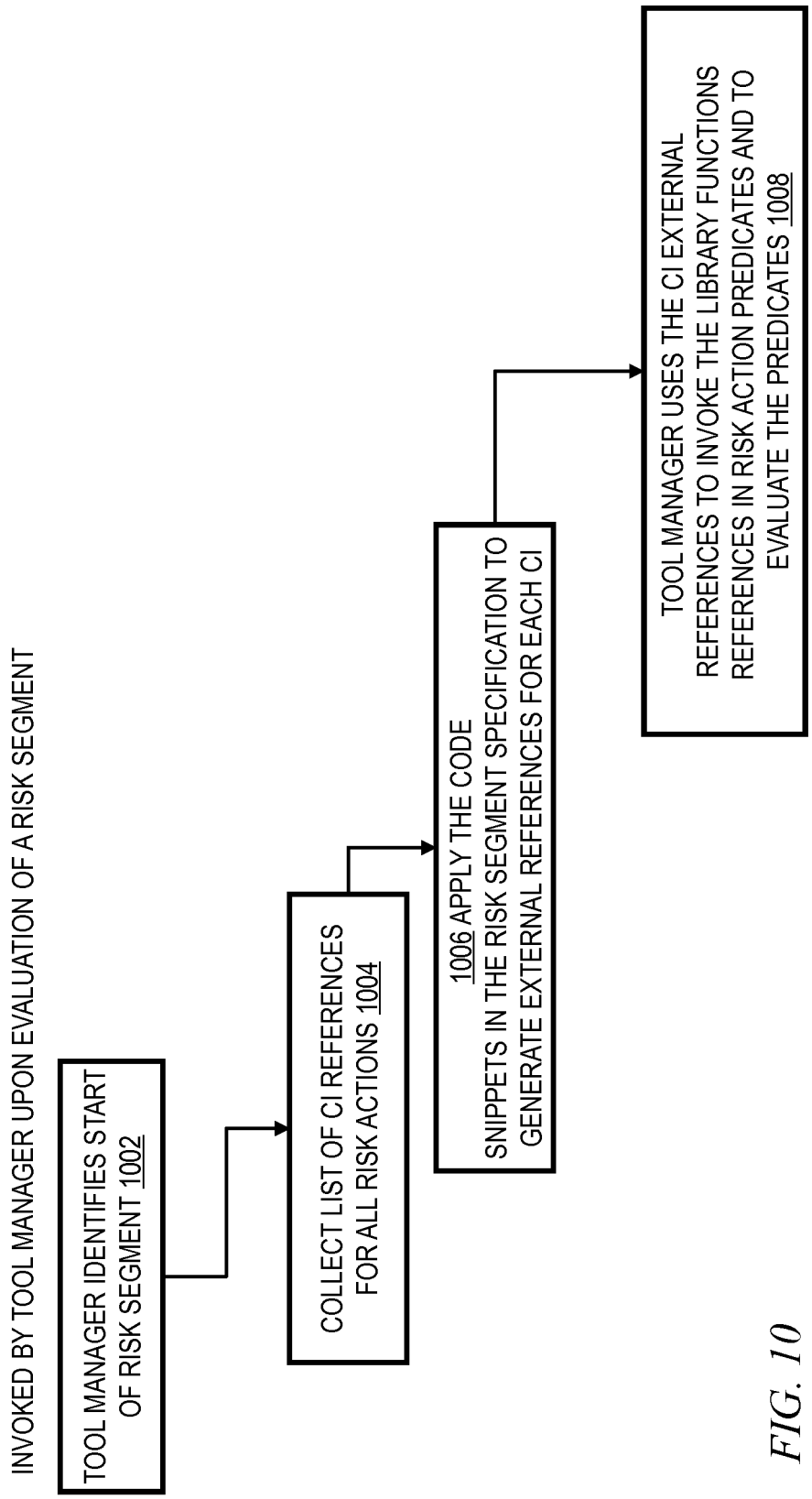
FIG. 10 shows a method for method for materialization of configuration item (CI) references within a risk segment, in accordance with an aspect of the invention.

FIG. 10 shows an exemplary method for materialization of CI references within a risk segment. During risk segment specification, SMEs specify a risk segment by identifying the segments of tool code where risk actions are being performed. The SME may delimit a risk segment for each individual RiskAction or may group subsequently executed RiskActions that apply to the same set of CIs. For each RiskAction in the RiskSegment the SME identifies the script snippets that generate an external reference for the CI; for instance, a file or directory path, a computing system Fully Qualified Host Name or IP Address, a database local name or alias, or an application command line. The convention for identifying CIs should be compatible with the CI patterns used in RiskActions. In one or more embodiments, the steps in FIG. 10 are invoked by Tool Manager 204 upon evaluation of a risk segment. In step 1002, the tool manager identifies start of the risk segment. In step 1004, collect a list of CI references for all risk actions. In step 1006, apply the code snippets in the risk segment specification to generate external references for each CI. In step 1008, tool manager uses the CI external references to invoke the library functions references in risk action predicates and to evaluate the predicates. A risk segment that corresponds to a loop statement (e.g., for each (file in dir) {remove file}) is handled as an individual risk segment for every iteration of the loop, i.e., the CIs are identified and predicates evaluated at every loop execution.

Figure 11:
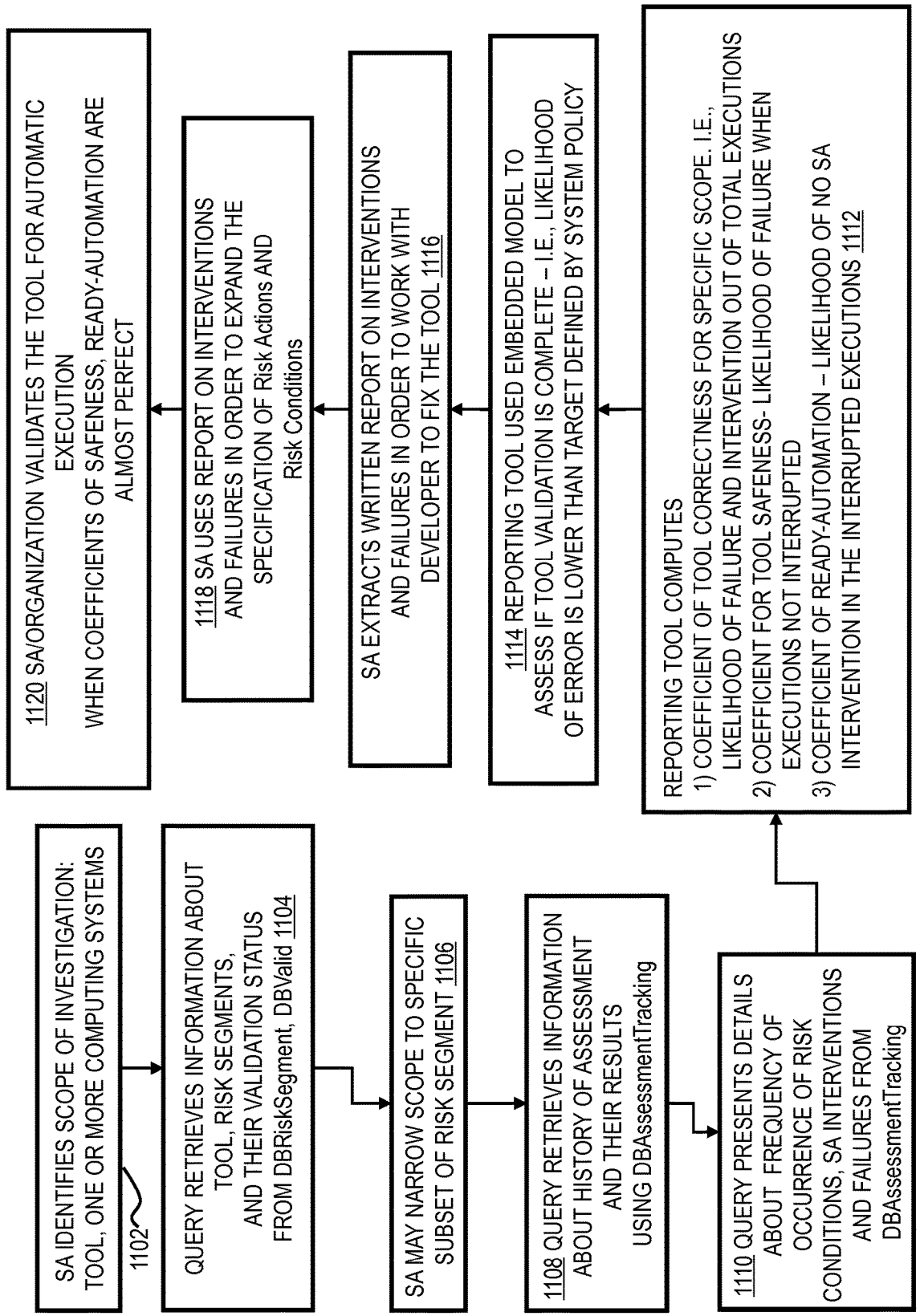
FIG. 11 shows a method for user to extract and use report on tool safeness, in accordance with an aspect of the invention.

FIG. 11 shows an exemplary method for a user to extract and use a report on tool safeness. In one or more embodiments, assume that a tool annotated for risk assessment is deployed on one or more systems; that the SA wants to extract information about the applicable risk actions, and history of execution; and that the SA uses dedicated reporting tool or ad hoc database queries. Again refer also back to the six exemplary databases discussed in connection with FIG. 2. In step 1102, the SA identifies the scope of investigation, including the tool, and one or more computing systems. In step 1104, a query retrieves information about the tool, risk segments, and their validation status from the database model of risk segments, DBRiskSegment, and the records on validated risk segments and CIs, DBValid. In step 1106, the SA may narrow the scope to a specific subset of risk segment. In step 1108, a query retrieves information about the history of assessment and the corresponding results, using DBAssessmentTracking. In step 1110, a query presents details about the frequency of occurrence of risk conditions, SA interventions and failures from DBAssessmentTracking.

In step 1112, the reporting tool computes:
1. Coefficient of tool correctness for specific scope. i.e., likelihood of failure and intervention out of total executions
2. Coefficient for tool safeness—likelihood of failure when executions not interrupted
3. Coefficient of ready-automation—likelihood of no SA intervention in the interrupted executions In step 1114, the reporting tool uses an embedded model to assess if tool validation is complete—i.e., likelihood of error is lower than target defined by system policy. In step 1116, the SA extracts a written report on interventions and failures in order to work with the developer to fix the tool. In step 1118, the SA uses the report on interventions and failures in order to expand the specification of Risk Actions and Risk Conditions. Finally, in step 1120, the SA and/or organization validates the tool for automatic execution when coefficients of safeness and ready-automation are almost perfect.

Consider now an exemplary method of assessing whether tool validation is complete. Each tool record in the tool repository includes the specification of a validation completion model. The reporting tool uses the validation completion model to assess the extent to which the tool is tested and reports same to the user. The tool repository can implement several models of validation completion.

In time-based validation, it is assumed that during a specific time interval, the collection of tool invocations will cover all of the possible input cases. The tool manager 204 records the dates and times when the tool is executed and compares same to the model. For this model, after several successful executions of a code path, the SA is given a recommendation to turn off the risk-assessment execution for all of the risk segments on that path.

In code path-based validation, it is assumed that a tool is validated if it was successfully executed through all of the paths in the code. The tool manager records details about the execution of each relevant code branch in the tested tool. The "if condition then exit-with-error" will not be accounted for, in one or more embodiments. For this model, after several successful executions of a code path, the SA is given a recommendation to turn off the risk-assessment execution for all of the risk segments on that path.

In input or system state-based validation, it is assumed that the tool is validated if it has executed successfully on all of the possible values or types of input. SMEs or SAs specify to the tool manager 204 the list of possible input parameter patterns or system state conditions. The tool manager will record details about each execution, in terms of input patterns and system-state conditions. For this model, after several successful executions on an input or system-state pattern, the SA is given a recommendation to turn off the risk-assessment execution for the particular value or pattern.

Figure 12:
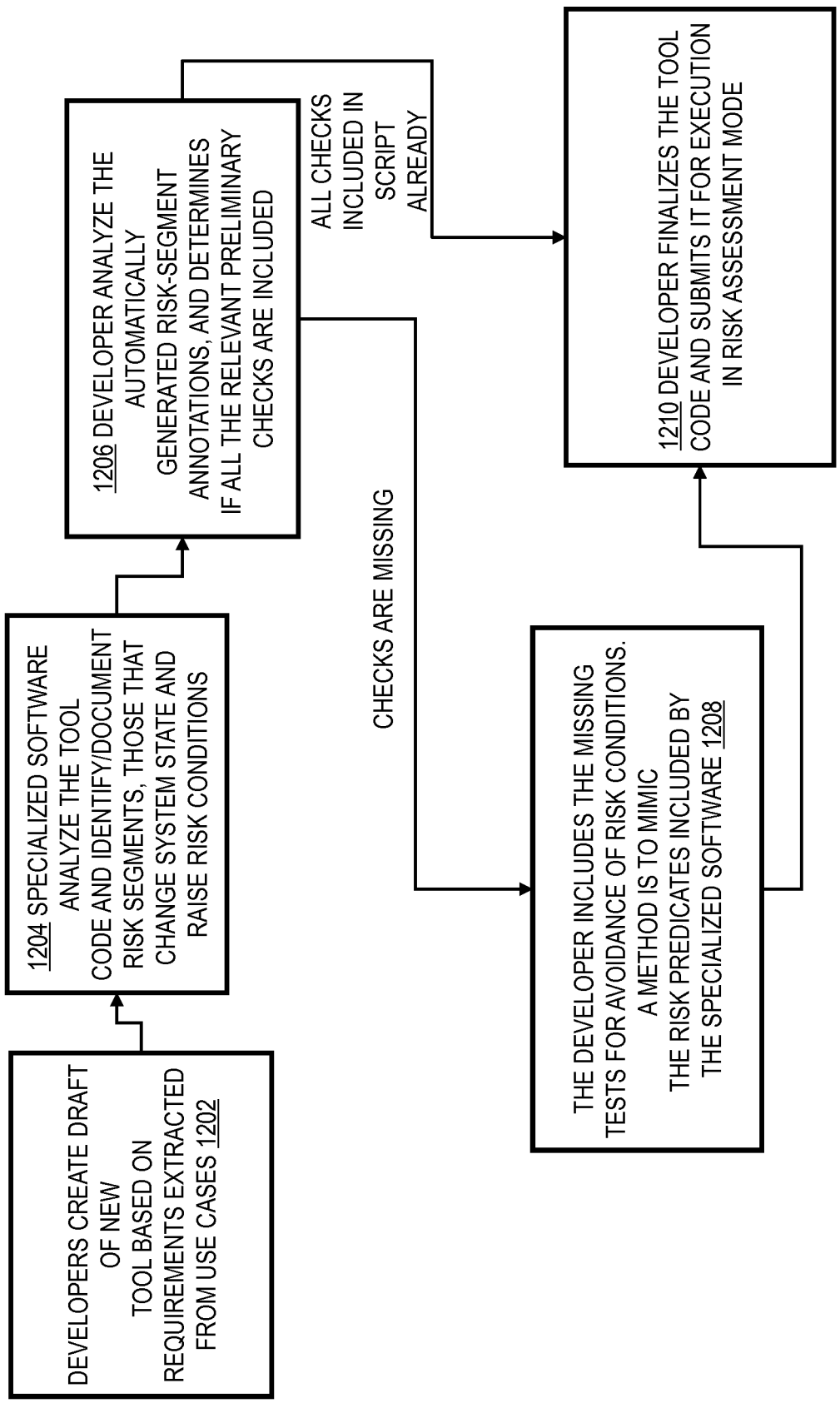
FIG. 12 shows a method of learning from best practices on risk conditions—preliminary validation of tool scripts, in accordance with an aspect of the invention.

FIG. 12 shows an exemplary method of learning from best practices on risk conditions, with preliminary validation of tool scripts. Note that in one or more embodiments, this is different from the build-time aspects of the method for building user confidence, inasmuch as, in this method, the developers are the beneficiary of the automated risk annotation. Using this annotation they become aware of the kinds of tests they should include in the script. In the other method referred to and discussed above, the tool is no longer managed by developers—rather, the SMEs perform the annotations and the extensions of the models to cover the types of risk actions present in the tool.

In step 1202, developers create a draft of a new tool based on requirements extracted from use cases. In step 1204, specialized software analyzes the tool code and identifies and/or documents risk segments; namely, those segments that change system state and raise risk conditions. In step 1206, the developer analyzes the automatically-generated risk-segment annotations, and determines whether all the relevant preliminary checks are included. If any checks are missing, proceed to step 1208 where the developer includes the missing tests for avoidance of risk conditions. One exemplary method is to mimic the risk predicates included by the specialized software. Then proceed to step 1210. On the other hand, if all checks are included in the script already, proceed directly to step 1210. In step 1210, the developer finalizes the tool code and submits it for execution in risk assessment mode.

Consider a method for tracking completion of validation with input or system state-based validation. In a non-limiting exemplary embodiment, SMEs or SAs specify to the tool manager 204 the list of possible input parameter patterns or system state conditions. An exemplary method is provided for representation of all possible input parameter is a tree. Each level of the tree describes the possible values of one of the input parameters or state conditions. A node represents a possible value, or range of values, for the parameter(s) corresponding to the current tree level that are applicable for the context defined by the values of other parameters and/or system states on the path to the root of the tree. A path from root to a leaf node describes a point in the set of inputs for tool evaluation. In some cases, the tree is created semi-automatically based on SME input.

The tool manager records details about each execution, in terms of input patterns and system-state conditions. The tool manger records the results of tool execution for each leaf node of the input tree. The reporting tool uses the collection of results to assess completion statistics—such as the percent of cases that have been evaluated. The SAs can inspect the tree and determine the sequence in which remaining cases will be validated. The SAs can mark two or more leaf nodes as being equivalent with respect to validation. As a result, the tool manager and reporting tool will extrapolate the results from one validation run to all of the nodes that are equivalent.

Advantageously, in one or more embodiments, risk assessment mode execution, with its identification of materialized risks, documentation of risk segments, and optional transfer to manual execution, enables the user to safely observe any impending potentially dangerous tool actions. Risk assessment mode enables user to test the tool in a risk-controlled execution while exploiting its automation capabilities when no risks are present. This helps capitalize on the benefits of automation, and balance the costs of risk assessment, now performed more effectively in the actual operating environment. Tracking of safe executions in relation to risk conditions provides the user with details about the test conditions in which the tool was applied, and helps the user develop confidence, inform and document his or her risk assessment decisions, and eventually encourages adoption of the new tool.

There is a large potential for improved service and/or reduced cost from the development, deployment, and adoption of automation tools in service delivery. However, heretofore, even if a useful automation tool was developed and deployed in production environments, there have been significant obstacles to adoption of these tools by the service delivery personnel. One or more embodiments solve one of the significant obstacles to adoption of automation of tools by end users, enabling the enterprise or other organization to benefit from its investments in service delivery automation.

One or more embodiments advantageously provide the incremental expansion of adoption based on incremental tool verification. One or more embodiments refer to a framework with a broader set of components and functions as compared to prior techniques which address the partial automation of script execution. At least some embodiments are helpful to a user of the tool, as compared to prior art techniques that are addressed to the programmer of the tool and allow it to see the results of each program step and reverses it if an important step was not examined closely enough; such prior art techniques are believed to require a tool user to learn too much about the tool implementation in order to be useful. Furthermore, as compared to prior-art techniques wherein non-programmers find and modify code that performs certain functions inside of unfamiliar programs, one or more embodiments provide techniques to assist the non-programmer to identify the pertinent sections of the code and/or how to demonstrate the code functionality safely. Yet further, one or more embodiments, beyond providing a method of testing command (safety or security) implications (note i.e., decision rule in prior art maps to command execution), further provide techniques for demonstrating software program behavior. Still further, one or more embodiments are not limited to showing how commands operate on input case data, but rather address the specific behavior of programs that would actually change the state of the computing system in any way.

Thus, one or more embodiments provide a system and/or method for building user confidence in software including a training mode that turns on simulation at certain steps of the program; building each simulation to demonstrate to the user what the program step will do, before it executes; and enabling the user to accept the simulated result, and execute the step; or to reject the simulated result, rollback any changes made, and exit the program. Further steps include deploying the software in users' environments initially with training mode enabled; and disabling training mode after the users have used the software in a large number of cases or after each user indicates a high level of confidence in the software.

In some cases, a system and/or method are provided wherein existing software is modified to include the training mode and simulations.

In some embodiments, a system and/or method are provided wherein the execution environment does not stop for a system administrator decision to proceed if the code segment is assessed as not raising any actual risk, either based on the risk model or by prior specification by the system administrator, that the specific code segment is safe for the current parameters and system state.

In some instances, a system and/or method are provided wherein the simulation is developed for program steps that may change the state of the computer system.

In some embodiments, a system and method are provided wherein execution of all state-changing steps is deferred until all simulation results have been approved, so that in the event that the user rejects a simulation result, no roll back is needed.

In some cases, a system and method are provided wherein the user rejection of a simulation result triggers display of documentation explaining the reason for the simulation result.

In some instances, a system and method are provided wherein the user rejection of a simulation result triggers notification of tool developers.

In another aspect, a method and/or system are provided for controlled execution of system management tools that identify and prevent the execution of unsafe code. In some cases, a system management tool is annotated by the system administrator to identify risky system-change operations; an execution risk-model is associated with the system; the system management tool is executed in an environment that can detect the segments of code with risky operation and check whether current script parameters and state of the computer raise any actual risk, as per a risk model registered with the environment; the execution environment provides online feedback to the system administrator about the level of risk of a code segment, and waits for system administrator to proceed if the risk level is high; and the system administrator can abort the execution of the risky code, or can override the segment with his or her own manual operations.

In some cases, the execution environment does not stop for a system administrator decision to proceed if the code segment is assessed as not raising any actual risk either based on the risk model or by prior specification by the system administrator that the specific code segment is safe for the current parameters and system state.

In some instances, a technique is provided for the system administrator to make decisions about the risk and fixes required by a system management tool based on information that he or she acquires from the tool execution environment about the quality of the tool, history of risk and outcomes.

In some embodiments, the risk model is defined by SMEs and augmented using configuration management database content and risk-awareness rules among CIs and their relations and properties.

In some cases, automated tools are used to create a preliminary annotation of a system management tool based on the risk model, which the system administrator will evaluate, revise, and register.

In some instances, a risk model from one computer can be reused in another computer system.

In another aspect, a method and/or system are provided for building confidence of a system administrator in productivity tools and incremental expansion of adoption, for building user confidence in build-time process, for building user confidence in run-time process, for controlling tool execution in risk assessment mode, for materialization of CI references within a risk segment(s) for the user to extract and use report(s) on tool safeness, for assessing if tool validation is complete, for learning from best practices on risk conditions (preliminary validation of tool scripts), and/or for tracking completion of validation with input or system state-based validation.

In one or more embodiments, risk assessment mode execution with its identification of materialized risks, documentation of risk segments, and optional transfer to manual execution, enables the user to observe safely any impending potentially dangerous tool actions; and/or risk assessment mode enables user to test the tool in a risk-controlled execution while exploiting its automation capabilities when no risks are present. This helps to capitalize on the benefits of automation, and to balance the costs of risk assessment, now performed more effectively in the actual operating environment. In some cases, tracking of safe executions in relation to risk conditions provides the user with details about the test conditions in which the tool was applied, and helps the user develop confidence, inform and document his or her risk assessment decisions, and eventually encourage adoption of a new tool.

Given the discussion thus far, it will be appreciated that, in general terms, an exemplary method, according to an aspect of the invention, includes the step 810 of executing a system management tool, with a risk assessment mode enabled, within an execution infrastructure on a management computer system, to manage a target computer system in a production situation. This step can be carried out, for example, by running tool 104 on system 106 or 108. A further step 914 includes, during execution of the system management tool with the risk assessment mode enabled, when the execution of the tool reaches a risk segment which raises risk for the target system, informing a user of the tool of at least one action to be executed in the risk segment. This step can be carried out, for example, by a user interface within the tool 104. A still further step 906 includes, if the user agrees, allowing the tool to execute in an automatic mode until an end of the risk segment is reached. This step can be carried out, for example, by allowing tool 104 to execute in response to agreement obtained from the user via the user interface of the tool 104. An even further step (e.g., 916) includes obtaining feedback from the user regarding safety of the risk segment. This step can be carried out, for example, by using reporting tool 210.

The steps mentioned in the immediately preceding paragraph are repeated for a plurality of additional risk segments until the system management tool is deemed safe for all of the risk segments; for example, under manual user control or a looping code segment within the tool. Once the system management tool is deemed safe for all of the risk segments, the system management tool is transitioned from the risk assessment mode to an automatic mode of operation, as shown at 820.

In one or more embodiments, once a risk segment is deemed safe, the tool manager no longer stops to inform the user and no longer waits for the user to allow execution and obtain feedback.

The repeating step, in some instances, is carried out over multiple invocations of the system management tool. However, in general, embodiments of the invention may employ single or multiple invocations. In the case of single invocations, a sufficient number of files (five hundred in a non-limiting example) should be handled to be confident of safety.

The management computer system and the target computer system are the same in some cases, as seen at 102, 106; and in other cases, the target computer system is remote from the management computer system, as seen at 108, 116.

In some instances, the method further includes identifying the risk segments, as generally seen in FIGS. 6 and 7.

In a non-limiting example, the identification of the risk segments includes, as seen at 702, 706, 710, for each line of code in the system management tool, identifying actions based on specifications in a supporting database, and identifying configuration items related to the actions based on a recorded action model. The identification of the risk segments further includes, as seen at 704, for each set of consecutive ones of the actions and its related configuration items, determining risk actions defined in the supporting database; as at 708, annotating the code with risk actions identified in the determining step; as at 712, analyzing the annotated code to determine the risk segments, as groups of consecutive risk actions and adjoining non-risk code; as at 712, grouping the risk actions in to different ones of the risk segments and to group the risk actions with the adjoining non-risk code (i.e., partitioning the set of risk actions). The identification of the risk segments further includes, as seen at 714, annotating the code with the risk segments.

In some cases, the grouping of the risk actions includes using a heuristic; however, an exact as opposed to a heuristic method could be used in other embodiments.

In some cases, a further step includes annotating the risk segments to indicate an output model; i.e., what pieces of content will be provided as feedback to the user.

One or more embodiments of the invention, or elements thereof, can be implemented in the form of an apparatus including a memory and at least one processor that is coupled to the memory and operative to perform exemplary method steps.

Figure 13:
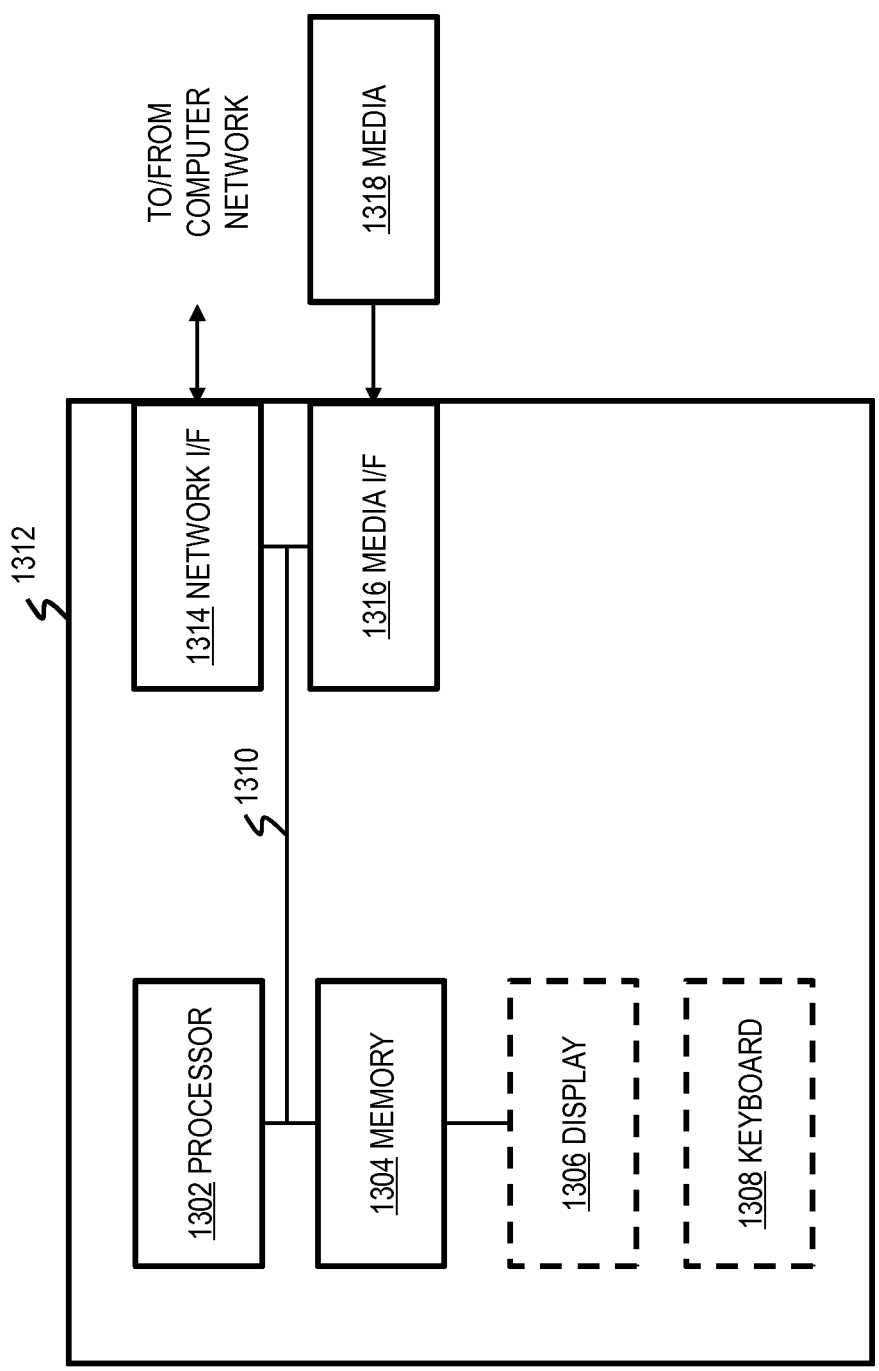
FIG. 13 depicts a computer system that may be useful in implementing one or more aspects and/or elements of the invention.

One or more embodiments can make use of software running on a general purpose computer or workstation. With reference to FIG. 13, such an implementation might employ, for example, a processor 1302, a memory 1304, and an input/output interface formed, for example, by a display 1306 and a keyboard 1308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1302, memory 1304, and input/output interface such as display 1306 and keyboard 1308 can be interconnected, for example, via bus 1310 as part of a data processing unit 1312. Suitable interconnections, for example via bus 1310, can also be provided to a network interface 1314, such as a network card, which can be provided to interface with a computer network, and to a media interface 1316, such as a diskette or CD-ROM drive, which can be provided to interface with media 1318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1302 coupled directly or indirectly to memory elements 1304 through a system bus 1310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1308, displays 1306, pointing devices, and the like) can be coupled to the system either directly (such as via bus 1310) or through intervening I/O controllers (omitted for clarity).

Network adapters such as network interface 1314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1312 as shown in FIG. 13) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a system management tool module with appropriate sub-modules such as a tool manager module, a tool repository module, a risk assessment reporting tool module, a supporting database module, and a user interface module (e.g., code within tool 102, 104 which interacts with user; for example, via a graphical user interface). The method steps can then be carried out using the distinct software modules and/or sub-modules of the system, as described above, executing on one or more hardware processors 1302. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   executing a system management tool, with a risk assessment mode enabled, within an execution infrastructure on a management computer system, to manage a target computer system in a production situation;
   during execution of said system management tool with said risk assessment mode enabled, when said execution of said tool reaches a risk segment which is not deemed safe:
      informing a user of said tool of at least one action to be executed in said risk segment;
      if said user agrees, allowing said tool to execute said risk segment;
      otherwise, overriding said risk segment with one or more alternate operations; and
      at least when said risk segment is executed, obtaining feedback from said user regarding whether said risk segment is deemed safe;
   repeating said executing, informing, allowing, and obtaining steps for a plurality of additional risk segments until all of said risk segments are deemed safe; and
   once all of said risk segments are deemed safe, transitioning said system management tool from said risk assessment mode to an automatic mode of operation;
   wherein a given one of said risk segments is conditionally executed until said given one of said risk segments is deemed safe;
   wherein said given one of said risk segments is automatically executed once said given one of said risk segments is deemed safe; and wherein said given one of said risk segments is conditionally executed at least once and then is automatically executed at least once.

2. The method of claim 1, further comprising, once said given one of said risk segments is deemed safe, refraining from informing said user of further executions of said given one of said risk segments and refraining from obtaining further feedback from said user regarding whether said given one of said risk segments is deemed safe.

3. The method of claim 1, wherein, in said executing step, said target computer system is remote from said management computer system.

4. The method of claim 1, further comprising identifying said risk segments.

5. The method of claim 4, wherein said identification of said risk segments comprises:
   for each line of code in said system management tool, identifying actions based on specifications in a supporting database, and identifying configuration items related to said actions based on a recorded action model;
   for each set of consecutive ones of said actions and its related configuration items, determining risk actions defined in said supporting database;
   annotating said code with risk actions identified in said determining step;
   analyzing said annotated code to determine said risk segments, as groups of consecutive risk actions and adjoining non-risk code;
   grouping said risk actions in to different ones of said risk segments and to group said risk actions with said adjoining non-risk code; and
   annotating said code with said risk segments.

6. The method of claim 5, wherein said grouping of said risk actions comprises using a heuristic.

7. The method of claim 5, further comprising annotating said risk segments to indicate an output model.

8. The method of claim 1, further comprising providing a system, wherein the system comprises distinct software modules, each of the distinct software modules being embodied on a computer-readable storage medium, and wherein the distinct software modules comprise a system management tool module, a user interface module, and a risk assessment reporting tool module;
   said executing of said system management tool is carried out by executing said system management tool module on at least one hardware processor;
   said informing of said user is carried out by said user interface module executing on said at least one hardware processor;
   said allowing of said tool to execute in said automatic mode comprises executing said system management tool module on said at least one hardware processor in response to user input via said user interface module executing on said at least one hardware processor; and
   said obtaining of said feedback from said user is carried out by said risk assessment reporting tool module executing on said at least one hardware processor.

9. A computer program product comprising a non-transitory computer readable storage medium having computer readable program code embodied therewith, said computer readable program code comprising:
   computer readable program code configured to provide a system management tool, with a risk assessment mode enabled, which executes within an execution infrastructure on a management computer system, to manage a target computer system in a production situation;
   computer readable program code configured to, during execution of said system management tool with said risk assessment mode enabled, when said execution of said tool reaches a risk segment which is not deemed safe:
      inform a user of said tool of at least one action to be executed in said risk segment;
      if said user agrees, allow said tool to execute said risk segment;
      otherwise, overriding said risk segment with one or more alternate operations; and
      at least when said risk segment is executed, obtain feedback from said user regarding whether said risk segment is deemed safe;
   computer readable program code configured to facilitate repeating said executing, informing, allowing, and obtaining steps for a plurality of additional risk segments until all of said risk segments are deemed safe; and
   computer readable program code configured to, once all of said risk segments are deemed safe, facilitate transitioning said system management tool from said risk assessment mode to an automatic mode of operation;
   wherein a given one of said risk segments is conditionally executed until said given one of said risk segments is deemed safe;
   wherein said given one of said risk segments is automatically executed once said given one of said risk segments is deemed safe; and
   wherein said given one of said risk segments is conditionally executed at least once and then is automatically executed at least once.

10. The computer program product of claim 9, further comprising:
    computer readable program code configured to, once said given one of said risk segments is deemed safe, refrain from informing said user of further executions of said given one of said risk segments; and
    computer readable program code configured to, once said given one of said risk segments is deemed safe, refrain from obtaining further feedback from said user regarding whether said given one of said risk segments is deemed safe.

11. The computer program product of claim 9, wherein said target computer system is remote from said management computer system.

12. The computer program product of claim 9, further comprising computer readable program code configured to identify said risk segments.

13. The computer program product of claim 12, wherein said computer readable program code configured to identify said risk segments comprises:
    computer readable program code configured to, for each line of code in said system management tool, identify actions based on specifications in a supporting database, and identify configuration items related to said actions based on a recorded action model;
    computer readable program code configured to, for each set of consecutive ones of said actions and its related configuration items, determine risk actions defined in said supporting database;
    computer readable program code configured to annotate said code with risk actions identified in said determining;

computer readable program code configured to analyze said annotated code to determine said risk segments, as groups of consecutive risk actions and adjoining non-risk code;

computer readable program code configured to group said risk actions in to different ones of said risk segments and to group said risk actions with said adjoining non-risk code; and computer readable program code configured to annotate said code with said risk segments.

14. The computer program product of claim 13, wherein said grouping of said risk actions comprises using a heuristic.

15. The computer program product of claim 13, further comprising computer readable program code configured to annotate said risk segments to indicate an output model.

16. An apparatus comprising:
a memory; and
at least one processor, coupled to said memory, and operative to:
provide a system management tool, with a risk assessment mode enabled, which executes within an execution infrastructure on a management computer system, to manage a target computer system in a production situation;
during execution of said system management tool with said risk assessment mode enabled, when said execution of said tool reaches a risk segment which is not deemed safe:
inform a user of said tool of at least one action to be executed in said risk segment;
if said user agrees, allow said tool to execute said risk segment;
otherwise, override said risk segment with one or more alternate operations; and
at least when said risk segment is executed, obtain feedback from said user regarding whether said risk segment is deemed safe;
facilitate repeating said executing, informing, allowing, and obtaining steps for a plurality of additional risk segments until all of said risk segments are deemed safe; and
once all of said risk segments are deemed safe, facilitate transitioning said system management tool from said risk assessment mode to an automatic mode of operation;
wherein a given one of said risk segments is conditionally executed until said given one of said risk segments is deemed safe;
wherein said given one of said risk segments is automatically executed once said given one of said risk segments is deemed safe; and
wherein said given one of said risk segments is conditionally executed at least once and then is automatically executed at least once.

17. The apparatus of claim 16, wherein said at least one processor is further operative to:
once said given one of said risk segments is deemed safe, refrain from informing said user of further executions of given one of said risk segments; and
once said given one of said risk segments is deemed safe, refrain from obtaining further feedback from said user regarding whether said given one of said risk segments is deemed safe.

18. The apparatus of claim 16, wherein said target computer system is remote from said management computer system.

19. The apparatus of claim 16, wherein said at least one processor is further operative to identify said risk segments.

20. The apparatus of claim 19, wherein said at least one processor is further operative to identify said risk segments by:
for each line of code in said system management tool, identifying actions based on specifications in a supporting database, and identifying configuration items related to said actions based on a recorded action model;
for each set of consecutive ones of said actions and its related configuration items, determining risk actions defined in said supporting database;
to annotating said code with risk actions identified in said determining;
analyzing said annotated code to determine said risk segments, as groups of consecutive risk actions and adjoining non-risk code;
grouping said risk actions in to different ones of said risk segments and grouping said risk actions with said adjoining non-risk code; and
annotating said code with said risk segments.

21. The apparatus of claim 16, further comprising a plurality of distinct software modules, each of the distinct software modules being embodied on a computer-readable storage medium, and wherein the distinct software modules comprise a system management tool module, a user interface module, and a risk assessment reporting tool module; wherein:
said at least one processor is operative to provide said system management tool by executing said system management tool module;
said at least one processor is operative to informing said user by executing said user interface module;
said at least one processor is operative to allow said tool to execute by executing said system management tool module in response to user input via said user interface module; and
said at least one processor is operative to obtain said feedback from said user by executing said risk assessment reporting tool module.

22. An apparatus comprising:
means for executing a system management tool, with a risk assessment mode enabled, within an execution infrastructure on a management computer system, to manage a target computer system in a production situation;
means for, during execution of said system management tool with said risk assessment mode enabled, when said execution of said tool reaches a risk segment which is not deemed safe:
informing a user of said tool of at least one action to be executed in said risk segment;
if said user agrees, allowing said tool to execute said risk segment;
otherwise, overriding said risk segment with one or more alternate operations; and
at least when said risk segment is executed, obtaining feedback from said user regarding whether said risk segment is deemed safe;
means for facilitating repeating said executing, informing, allowing, and obtaining steps for a plurality of additional risk segments until all of said risk segments are deemed safe; and means for, once all of said risk segments are deemed safe, facilitating transitioning said system management tool from said risk assessment mode to an automatic mode of operation;

wherein a given one of said risk segments is conditionally executed until said given one of said risk segments is deemed safe;

wherein said given one of said risk segments is automatically executed once said given one of said risk segments is deemed safe; and wherein said given one of said risk segments is conditionally executed at least once and then is automatically executed at least once.

23. The method of claim 1, wherein said given one of said risk segments raises risk for said target system.

24. The method of claim 1, wherein informing said user comprises emulating said at least one action to be executed.

25. The method of claim 1, wherein informing said user comprises providing said user with one or more results of prior execution of said risk segment.

* * * * *